(12) United States Patent
Bédard

(10) Patent No.: US 10,891,796 B2
(45) Date of Patent: Jan. 12, 2021

(54) SYSTEMS AND METHODS FOR AUGMENTED REALITY APPLICATIONS

(71) Applicant: EIDOS INTERACTIVE CORP., Montréal (CA)

(72) Inventor: Renaud Bédard, Montréal (CA)

(73) Assignee: EIDOS INTERACTIVE CORP., Montréal (CA)

(*) Notice: Subject to any disclaimer, the term of this patent is extended or adjusted under 35 U.S.C. 154(b) by 0 days.

(21) Appl. No.: 16/551,514

(22) Filed: Aug. 26, 2019

(65) Prior Publication Data
US 2020/0380790 A1 Dec. 3, 2020

(30) Foreign Application Priority Data
Jun. 3, 2019 (CA) ..................... 3045133

(51) Int. Cl.
*G06T 19/00* (2011.01)
*G06T 15/00* (2011.01)
*G06T 15/04* (2011.01)

(52) U.S. Cl.
CPC .......... *G06T 19/006* (2013.01); *G06T 15/005* (2013.01); *G06T 15/04* (2013.01); *G06T 2215/12* (2013.01)

(58) Field of Classification Search
None
See application file for complete search history.

(56) References Cited

U.S. PATENT DOCUMENTS

| | | | | |
|---|---|---|---|---|
| 6,856,321 | B2* | 2/2005 | Tsukizaki | G06T 15/04 345/582 |
| 8,803,879 | B1* | 8/2014 | Newhall, Jr. | G06T 15/04 345/419 |
| 2008/0106549 | A1* | 5/2008 | Newhall, Jr. | G06T 15/60 345/426 |
| 2011/0285747 | A1* | 11/2011 | Kilgard | G06T 11/203 345/613 |
| 2013/0194259 | A1* | 8/2013 | Bennett | G06T 19/006 345/420 |
| 2016/0133048 | A1* | 5/2016 | Acree | G01C 21/00 345/426 |
| 2016/0155261 | A1* | 6/2016 | Iborra Olba | G06T 15/04 345/426 |
| 2018/0268604 | A1* | 9/2018 | Story | G06T 15/60 |
| 2020/0035032 | A1* | 1/2020 | Klein | G06T 19/006 |

(Continued)

OTHER PUBLICATIONS

Kán, Peter, and Hannes Kaufmann. "Physically-Based Depth of Field in Augmented Reality." Eurographics (Short Papers). 2012.*

(Continued)

*Primary Examiner* — Ryan M Gray
(74) *Attorney, Agent, or Firm* — Fenwick & West LLP (57) ABSTRACT

Methods, systems and processor-readable storage media for rendering a virtual shadow onto a real-world surface in an image are described. Using an augmented reality application running on a computing device having a camera, the method comprises capturing an image of a scene and detecting a real-world surface therein. A transparent occluding virtual plane is rendered onto the real-world surface. A texture associated with a virtual object is then written to a shadow buffer and projected onto the transparent occluding virtual plane.

33 Claims, 10 Drawing Sheets

(56) References Cited

U.S. PATENT DOCUMENTS

2020/0051332 A1* 2/2020 Fenney ................ G06T 17/20

OTHER PUBLICATIONS

Supan, Peter, and Ines Stuppacher. "Interactive image based lighting in augmented reality." Central European Seminar on Computer Graphics. vol. 17. 2006.*
Dos Santos, Artur Lira, et al. "Real time ray tracing for augmented reality." 2012 14th Symposium on Virtual and Augmented Reality. IEEE, 2012.*
Haller, Michael, Stephan Drab, and Werner Hartmann. "A real-time shadow approach for an augmented reality application using shadow volumes." Proceedings of the ACM symposium on Virtual reality software and technology. 2003.*
Kakuta, Tetsuya, Takeshi Oishi, and Katsushi Ikeuchi. "Virtual Asukakyo: Real-time Soft Shadows in Mixed Reality using Shadowing Planes." Digitally Archiving Cultural Objects. Springer, Boston, MA, 2008. 457-471.*
Hasenfratz, J-M., et al. "A survey of real-time soft shadows algorithms." Computer Graphics Forum. vol. 22. No. 4. Oxford, UK and Boston, USA: Blackwell Publishing, Inc, 2003.*

* cited by examiner

SYSTEMS AND METHODS FOR AUGMENTED REALITY APPLICATIONS

CROSS-REFERENCE TO RELATED APPLICATION

This application claims priority to Canadian Patent Application No. 3,045,133 filed on Jun. 3, 2019, which is incorporated by reference herein in its entirety.

FIELD

The disclosure relates to the field of Augmented Reality (AR) applications. In particular, the disclosure relates to systems and methods for rendering virtual shadows on transparent occluding AR planes in a mobile AR application.

BACKGROUND

Augmented Reality (AR) was develop as a series of technologies aimed at overlaying computer-generated virtual images onto a user's view of the real-world. The widespread use of Global Positioning System (GPS) chips, digital compasses and accelerometers in mobile devices such as smart phones has led to a growth in mobile AR applications. While such mobile devices typically have far less processing power than personal computers, their portability has been a catalyst for the proliferation of mobile AR applications.

As the sophistication of mobile technologies grows, many mobile AR applications provide functionality that goes beyond simply overlaying virtual elements onto real-world scenes, by incorporate real-time visual and auditory interaction between virtual and real-world objects. Accordingly, mobile AR applications increasingly require the seamless mixing of virtual and real-world elements.

Implementations of such interactivity include placing virtual visual elements, such as virtual shadows, onto real-world objects, and simulating the occlusion of virtual objects by real-world surfaces. One technique for achieving simulated occlusion is to generate transparent occluding AR planes onto real-world surfaces that have been detected in a scene. While this technique works well for achieving occlusion, it present a number of technical disadvantages when used for rendering shadows.

More specifically, known techniques for rendering shadows include shadow mapping, which comprises drawing all opaque objects that should be considered as shadow casters into a shadow map (i.e. a depth map rendered from the viewpoint of the relevant light source). Then, for each light source, the depth of each drawn pixel is tested against the depth stored in the shadow map in order to determine if that pixel lies in a shadowed region or not. As a result, attempting to cast a shadow onto a transparent occluding AR plane results in one of two suboptimal outcomes. Either the shadow caster casts a shadow on multiple surfaces (i.e. the transparent occluding AR plane and the surface located behind it from the viewpoint of the light source), or the transparent occluding AR plane itself casts a shadow on the surface located behind it from the viewpoint of the light source. Both outcomes lead to unrealistic 3D shadow properties, thereby making seamless integration of virtual and real-world objects more difficult.

The increasing ubiquity of mixing virtual and real-world elements, coupled with the deficiencies with known methods, has led to the need for systems and methods for rendering virtual shadows on transparent occluding AR planes resulting in realistic properties when 3D virtual objects are mixed into a scene with real-world objects.

SUMMARY

According to a first aspect, there is provided a method of rendering a virtual shadow onto a real-world surface in an image using an augmented reality application running on a computing device having a camera. The method comprises the steps of capturing an image of a scene using the camera and detecting the real-world surface in the image. The method also comprises the steps of obtaining the geometry of the real-world surface and rendering a transparent occluding virtual plane onto the real-world surface by using the obtained geometry. The method further comprises the step of creating a virtual directional light for the image, the virtual directional light radially extending from a point in space in the scene. In some embodiments, the point in space may be the zenith of the scene. In such an embodiment, the shadow cast by the virtual directional light would be cast directly above all objects in the scene. In other embodiments, the point in space is determined by locating the strongest real-world light source. In yet other embodiments, the point in space in the scene may be any other point in the scene. The method further comprises using the created virtual directional light source to write a texture associated with a virtual object into a shadow buffer and projecting the texture written to the shadow buffer onto the transparent occluding virtual plane in the image.

According to a further aspect, there is provided a system for rendering a virtual shadow onto a real-world surface in an image using an augmented reality application running on a computing device having a camera. The system comprises a processing entity configured to capture an image of a scene using the camera, detect the real-world surface in the image and obtain the geometry of the real-world surface. The processing entity is further configured to render a transparent occluding virtual plane onto the real-world surface by using the obtained geometry. The processing entity is further configured to create a virtual directional light for the image, the virtual directional light radially extending from a point in space in the scene. The processing entity is further configured to use the created virtual directional light source to write a texture associated with a virtual object into a shadow buffer and project the texture written to the shadow buffer onto the transparent occluding virtual plane in the image.

According to a further aspect, there is provided a processor-readable storage medium, having processor-executable instructions stored thereon, which, when executed by a processor, cause a computing device comprising the processor and a camera to implement an augmented reality application. The augmented reality application is configured to capture an image of a scene using the camera, detect the real-world surface in the image and obtain the geometry of the real-world surface. The augmented reality application is further configured to render a transparent occluding virtual plane onto the real-world surface by using the obtained geometry. The augmented reality application is further configured to create a virtual directional light for the image, the virtual directional light radially extending from a point in space in the scene and use the created virtual directional light source to write a texture associated with a virtual object into a shadow buffer. The augmented reality application is further configured to project the texture written to the shadow buffer onto the transparent occluding virtual plane in the image.

These and other aspects and features of the present invention will now become apparent to those of ordinary skill in the art upon review of the following description of specific embodiments of the invention in conjunction with the accompanying drawings.

The accompanying drawings are intended to show example non-limiting embodiments and are not intended to be limitative.

DETAILED DESCRIPTION

Figure 1:
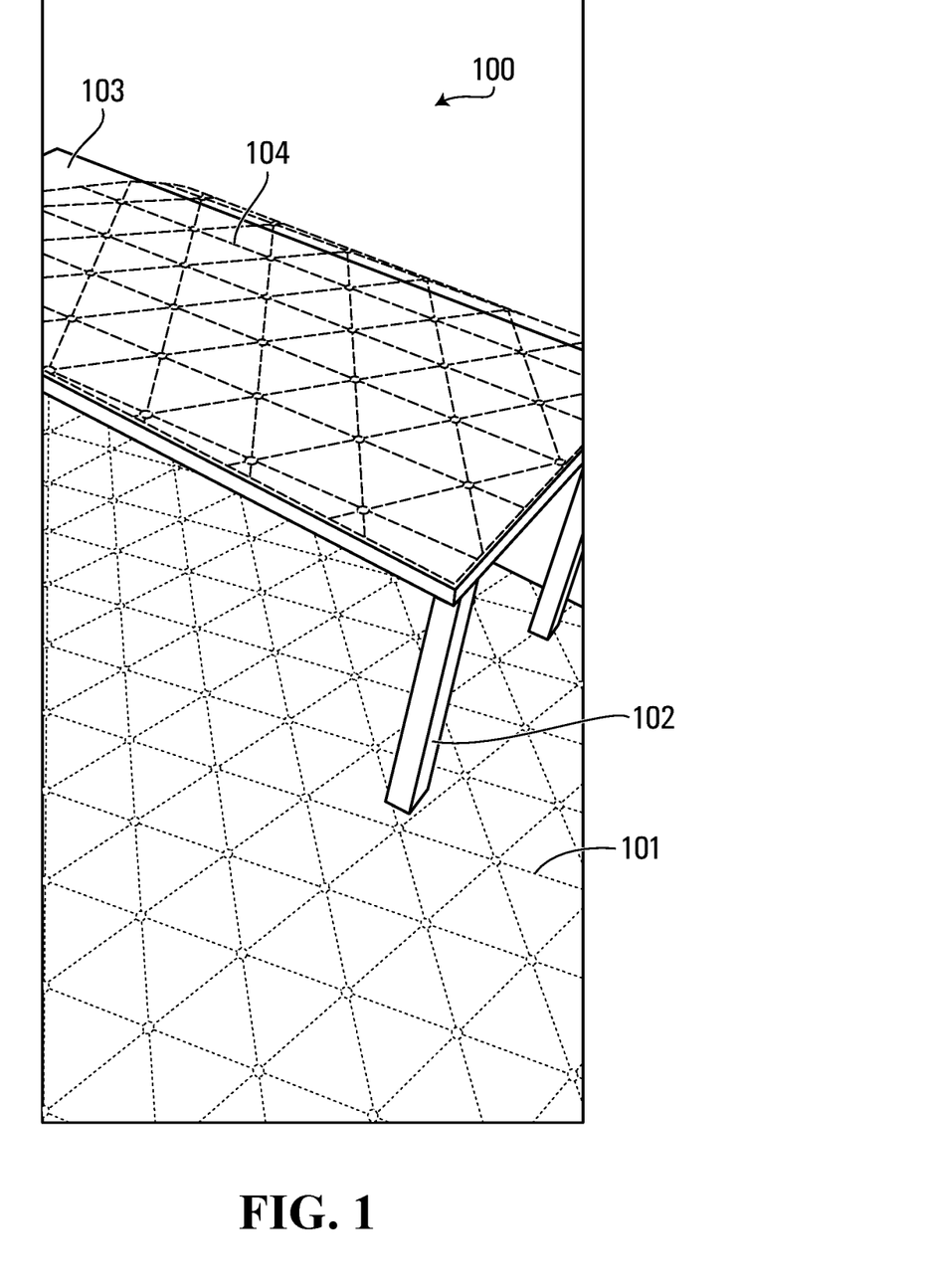
FIG. 1 is a diagram illustrating a scene, captured by a mobile AR application, comprising a tabletop surface of a real-world table and a real-world floor surface, each covered by an AR plane.

FIG. 1 shows a scene 100 captured by a mobile AR application. In some embodiments, the mobile AR application is run on a mobile device, such as a smartphone (not shown) or a tablet (not shown). The scene 100 comprises a real-world table 102 having a real-world tabletop surface 103 and real-world floor surface 101. In this example, the floor surface 101 has been detected by the mobile AR application and the tabletop surface 103 has also been detected by the mobile AR application. An AR plane has been generated on top of each of the tabletop surface 103 and the floor surface. In particular, an AR plane 104 has been generated on top of tabletop surface 103 and an AR plane 101 has been generated on top of the floor surface.

Figure 2:
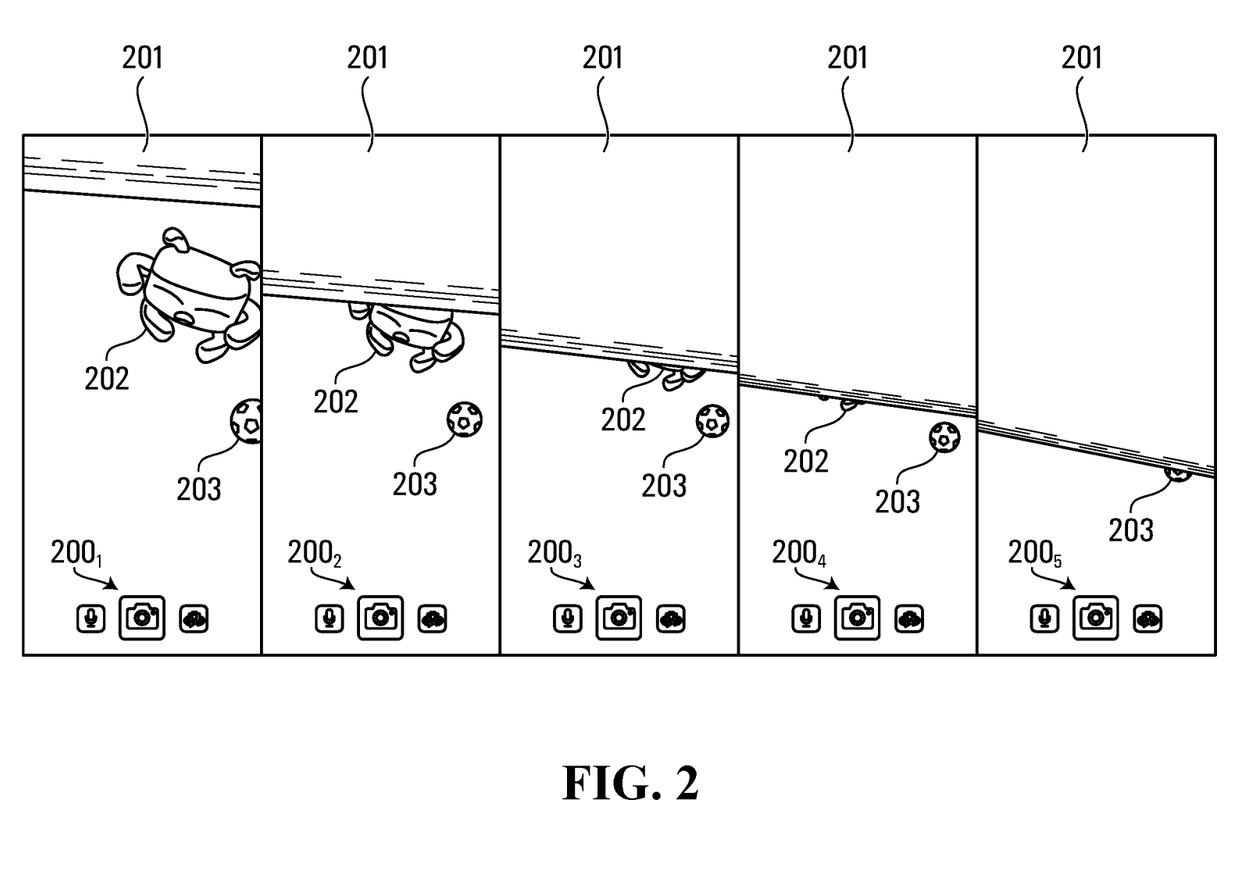
FIG. 2 is a diagram illustrating a series of scenes, captured by a mobile AR application, in which a virtual character appear to be occluded by a real-world table surface.

FIG. 2 shows a sequential series of scenes on the screen 2001-2005 of a mobile device (not shown), in which a virtual character 202 and a virtual object 203 appear to be progressively occluded from view by a real-world tabletop 201. This effect is created by rendering an AR plane onto the tabletop 201 (as shown in FIG. 1) with a shader that makes the AR plane visually transparent, but still writing the AR plane to the depth buffer for the scene in order to make it occluding. As defined herein, a shader is a computer program, module or algorithm that determines how 3D surface properties of objects are rendered, and how light interacts with the object within the mobile AR application.

Rendering the visually transparent AR plane using a shader that makes the plane visually transparent has the effect of blocking the rendering of other virtual objects that are behind the AR plane, which then creates the illusion that real-world surfaces are blocking virtual objects from view. In rendering an "occluding" AR plane, it is possible to separate the process of writing to the depth buffer and rendering the target color. Accordingly, by discarding the color writes while performing a regular write to the depth buffer, it is possible to make the occluding AR plane completely transparent, and yet also capable of receiving a shadow.

Figure 3:
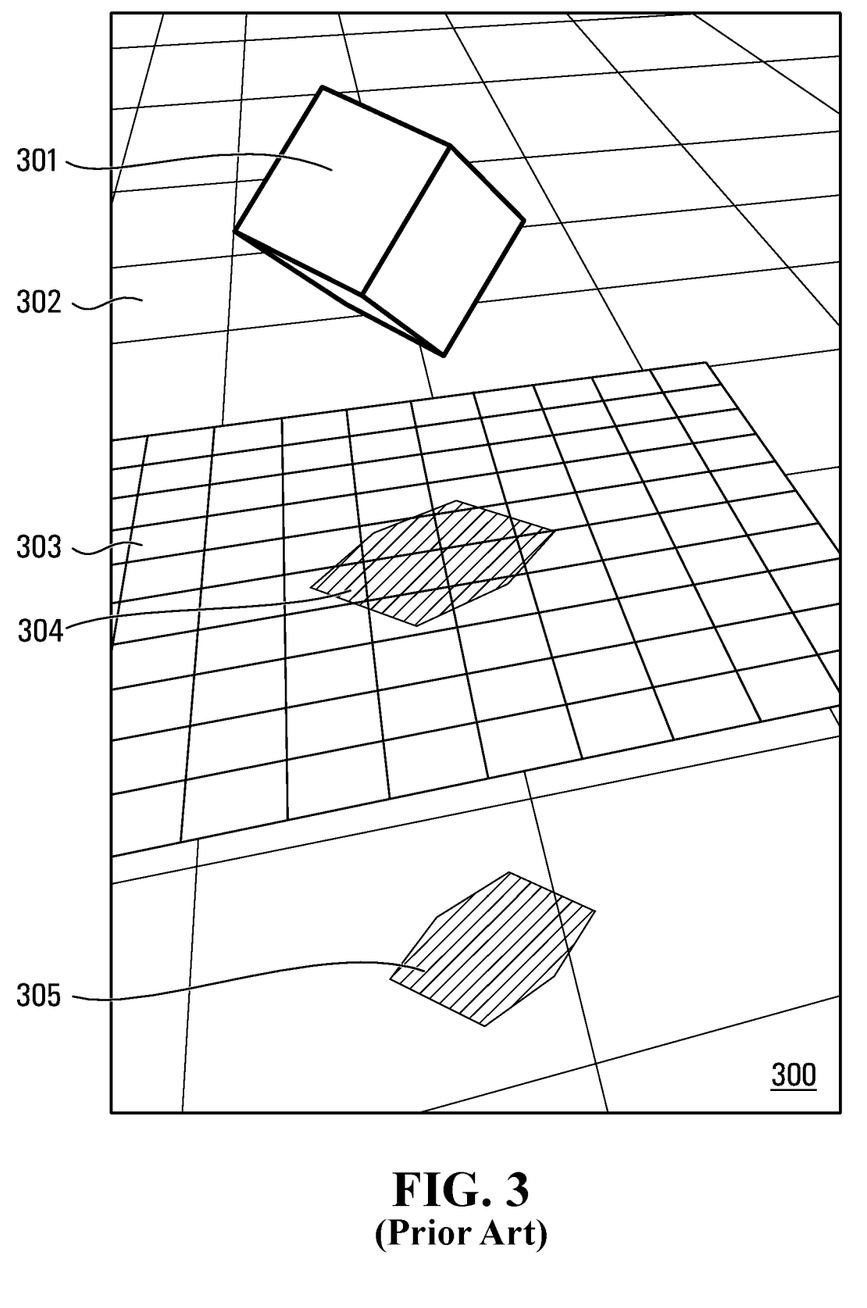
FIG. 3 is a diagram illustrating a virtual object casting a virtual shadow on each of a transparent AR plane and a surface located beneath the transparent AR plane in accordance with the prior art.

A technical difficulty arises however when such a transparent occluding AR plane is use as a shadow receiving surface. As is shown in FIG. 3, by using a traditional shadow mapping technique, the shadow caster (i.e. virtual object 301) casts shadows on multiple surfaces. As shown in FIG. 3, shadow 304 is cast onto the transparent occluding AR plane 303 and shadow 305 is cast onto floor plane 302. This is because traditional shadow mapping techniques rely on drawing all opaque objects that should be considered as shadow casters into a shadow map (i.e. rendering pre-pass) and then testing the depth of each drawn pixel against the depth stored in the shadow map in order to determine if that pixel lies in a shadowed region or not (i.e. main rendering pass). In particular, the reason for the duplication of shadows using this technique is because the transparent occluding AR plane of FIG. 3 is not written to the shadow map, but the floor plane 302 is written to the shadow map. As will be appreciated, this results in a scene comprising a mix of 3D virtual objects and real-world objects having unrealistic properties.

Figure 4:
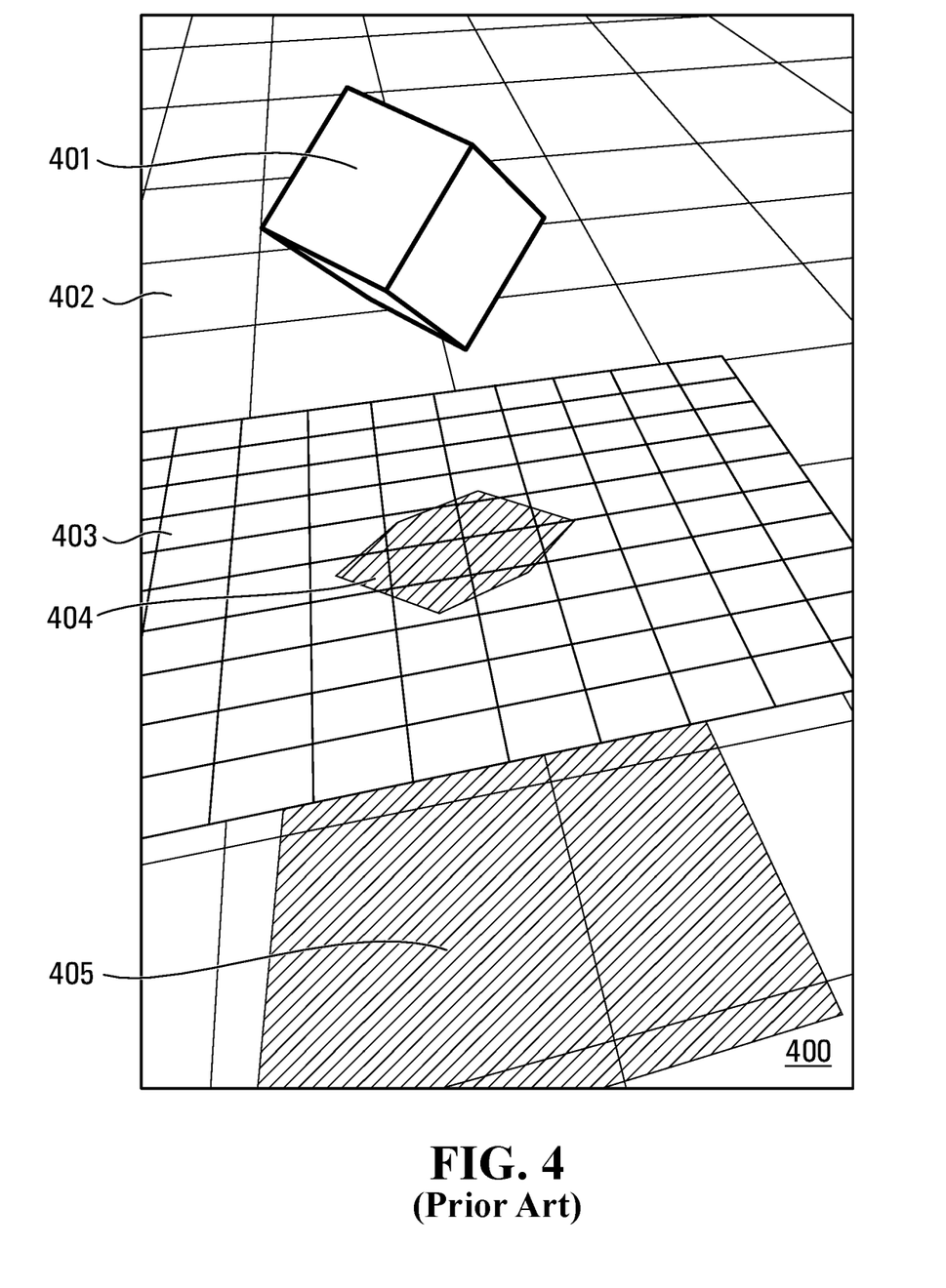
FIG. 4 is a diagram illustrating a virtual object casting a virtual shadow on a transparent AR plane, and the transparent AR plane casting a virtual shadow a virtual surface located beneath the transparent AR plane in accordance with the prior art.

One way of addressing this problem is to write the transparent occluding AR plane to the shadow map. This solution however creates a new problem, which is shown in scene 400 of FIG. 4. In particular, if the transparent occluding AR plane 404 is written to the shadow map, it becomes of shadow caster. Accordingly, while shadow 403 is correctly cast on the transparent occluding AR plane 404 by virtual object 402, shadow 405 is also cast on the floor plane 401 by transparent occluding AR plane 404. As will be appreciated, this also results in a scene comprising a mix of 3D virtual objects and real-world objects having unrealistic properties.

Figure 5:
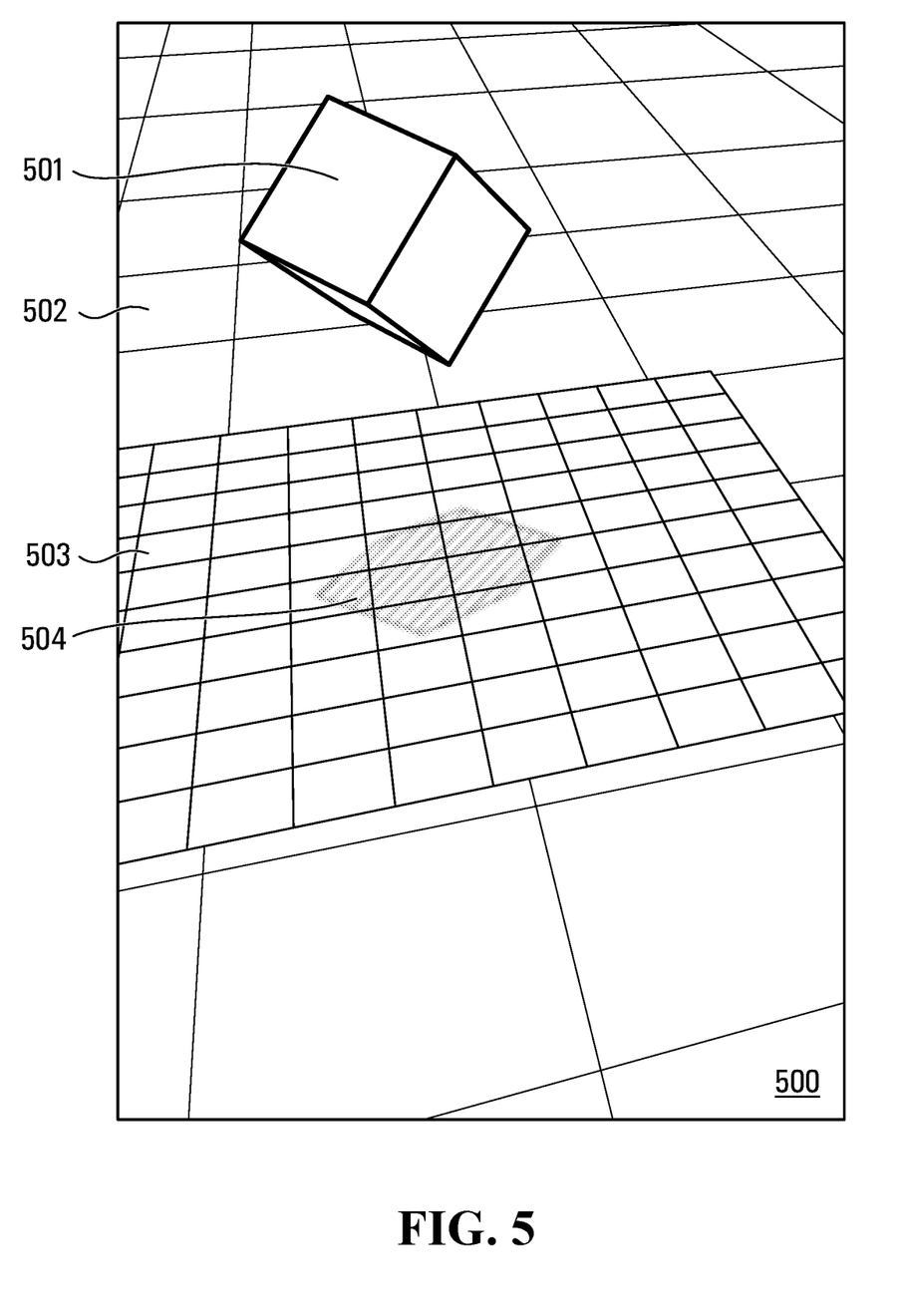
FIG. 5 is a diagram illustrating a virtual object casting a virtual shadow on a transparent AR plane in accordance with an embodiment of the present disclosure.

The systems and methods described herein solve these problems by producing, for example, scene 500 shown in FIG. 5, in which shadow 502 is cast on transparent occluding AR plane 503 by virtual object 501, while no shadow is cast on floor plane 504, either by virtual object 501 or by transparent occluding AR plane 503. This produces a scene having realistic properties, and can be achieved using the method 1000 described in FIG. 10.

Figure 10:
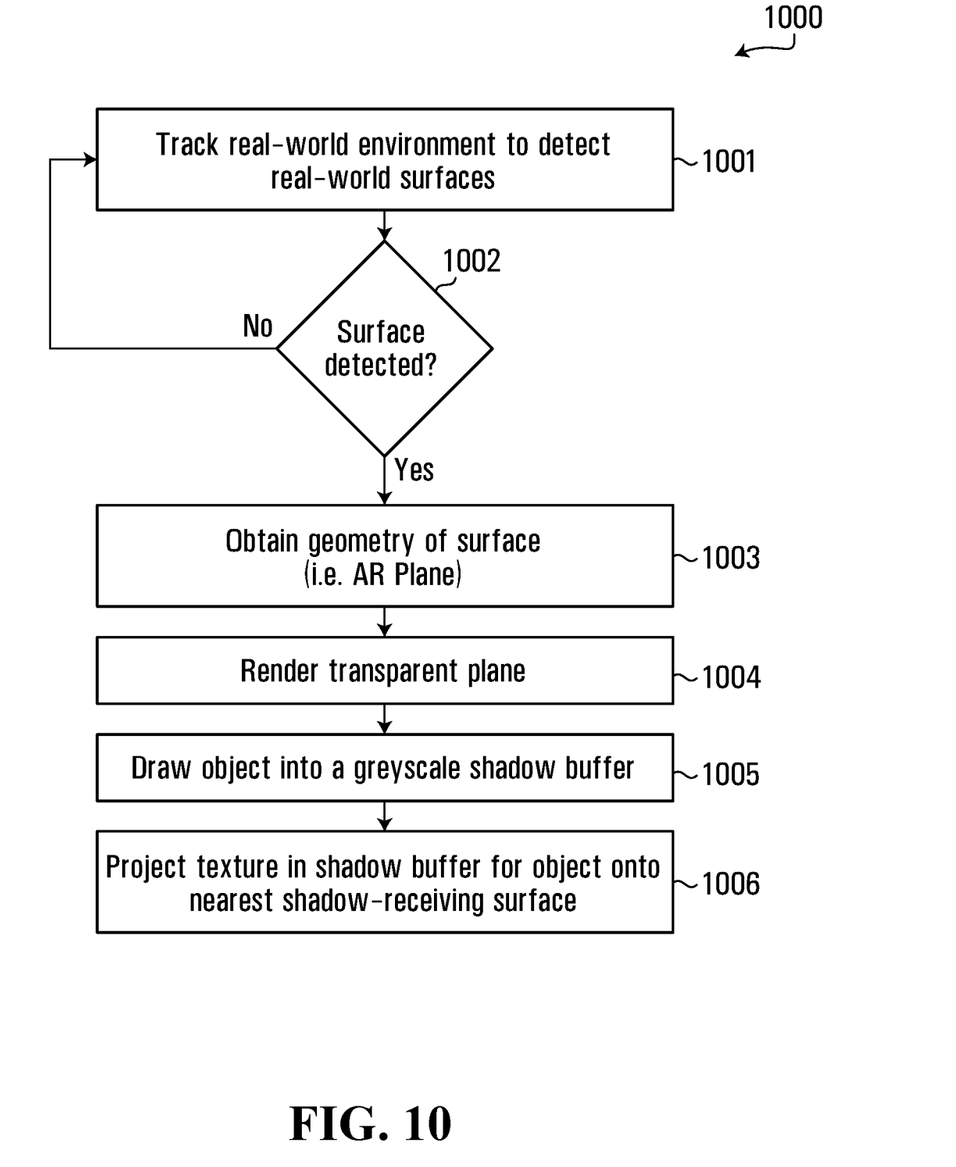
FIG. 10 is a flowchart illustrating steps in rendering a shadow on a transparent AR plane in accordance with the present disclosure.

As shown in FIG. 10, in some embodiments, the method 1000 comprises a first step 1001, in which the mobile AR application constantly tracks a real-world environment to detect real-world surfaces. Until a surface is detected at step 1002, the method continues to track the real-world environment to detect real-world surfaces. As shown in FIG. 1, when surface 103 is detected at step 1002, the mobile AR application obtains the geometry of the surface 103 at step 1003. In order the words, the AR application creates an occluding AR plane 104. Then, at step 1004, the occluding AR plane is rendered transparent, as described, for example, above. Thus, while the occluding AR plane 104 is transparent, it can receive shadows cast by other virtual objects.

At step 1005, a greyscale shadow buffer is created and a representation of the virtual object 501 is draw from the light source's perspective. In particular, the AR application creates a virtual directional light which acts as the sun in the real-world (or the strongest light source in an indoor environment), and then uses this light source for shadow casting. As will be appreciated by the skilled reader, traditional shadow-mapping techniques can also be used in conjunction with this method.

Once the representation of the virtual object 501 has been written to the shadow buffer, the AR application projects the texture written in the shadow buffer onto the nearest shadow-receiving surface 503 at step 1006, but using, for example, the method of projective texture mapping, which allows a textured image to be projected onto a scene, and is well known in the art (e.g. the Projector component created by Unity Technologies™). In particular, the AR application uses multiplicative blending to draw the shadow 502 into the scene 500. As shown in FIG. 5, in some embodiments, the AR application also samples the ambient lighting at the vertex location of the virtual shadow and the transparent occluding AR plane such that the shadow's color becomes tinted by ambient light coming from the virtual scene. This advantageously avoids an unnaturally black shadow. In a non-limiting example, the sampling can be accomplished using the Light Probe system created by Unity Technologies™. In some embodiments, the tinting the shadow color can be achieved by adding the ambient color to the shadow color when rendering the shadow projector, thereby giving it a baseline color instead of being fully black.

The above-described methods provide a number of advantages over known techniques. For example, and as mentioned above, the method does not result in shadows being cast on multiple overlapping surfaces, nor does it result in transparent planes casting shadows. Instead, the methods result in a single shadow being rendered onto a transparent occluding AR plane, which itself casts no shadow.

Moreover, because parts of the shadow buffer are drawn onto the transparent occluding AR plane as-is (i.e. as written into the shadow buffer, as opposed to being used simply for depth value comparisons), it is possible to blur shadows before projecting/drawing them (as shown in FIG. 5). As will be appreciated by the skilled reader, this results in softer looking shadows that are not computationally onerous as compared to creating soft shadows by way of shadow mapping.

Furthermore, since the AR application treats every shadow-casting object separately, it is possible to update each one at any desired frequency, which will contribute to increasing performance. For example, shadow buffers from previous frames can easily be used, and are not tied to the shadow casting object's position (i.e. if the object moves, the shadow can be moved without requiring a re-draw of the shadow buffer).

Figure 6:
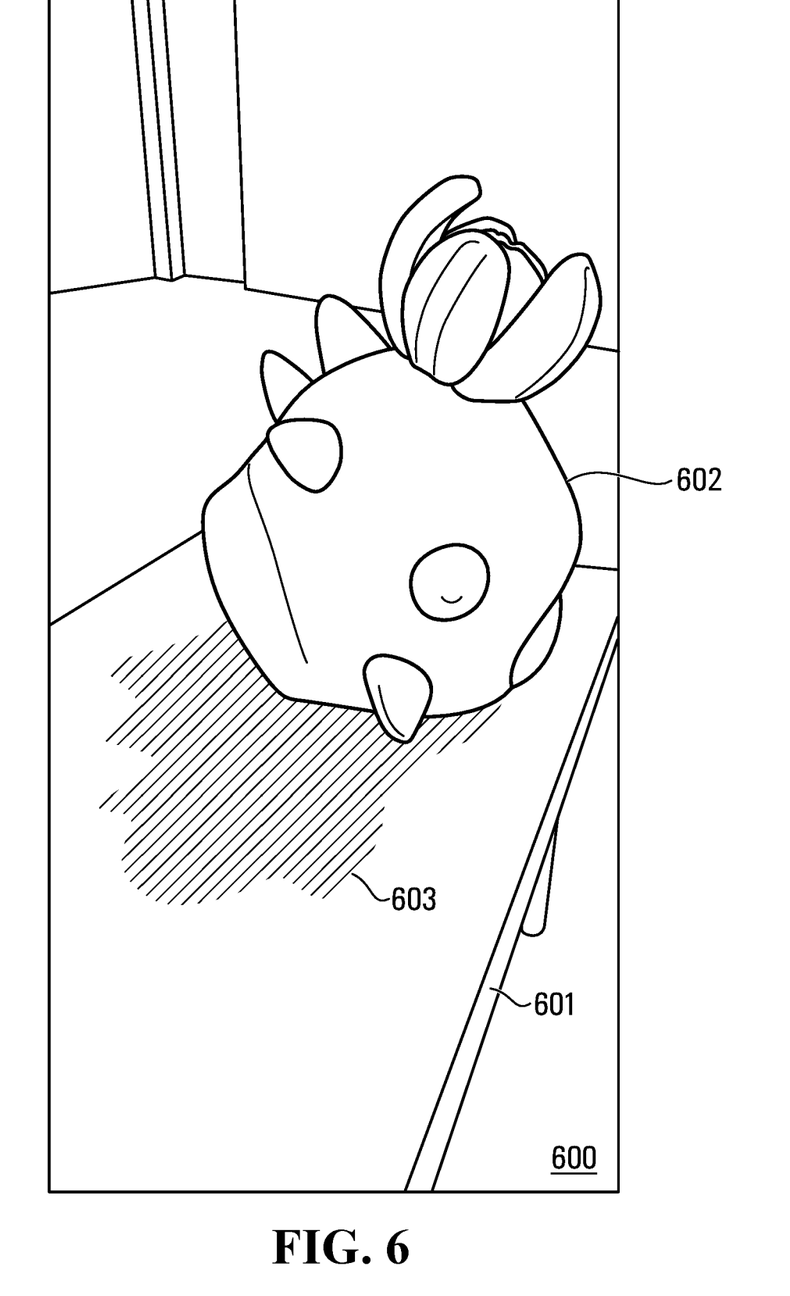
FIG. 6 is a diagram illustrating a scene in which a virtual character is rendered on a real-world surface, and casts a virtual shadow in accordance with an embodiment of the present disclosure.

FIG. 6 is an illustration of a scene showing a shadow 603 from a virtual character 602 rendered onto a transparent AR plane (not shown), which transparent AR plane is overlaid atop a real-world table 601, using the method described herein. As can be seen, the resulting effect is that of a virtual shadow 603 being cast on a real-world surface 601 by a virtual object 602.

Other advantages of the systems and methods described herein will be readily apparent to the skilled reader. For example, because the transparent occluding AR planes render to the depth buffer of a scene like regular virtual geometry, they provide the necessary data for multiple screen-space effects that make virtual objects and real-world physical surfaces interact in realistic ways.

Figure 7:
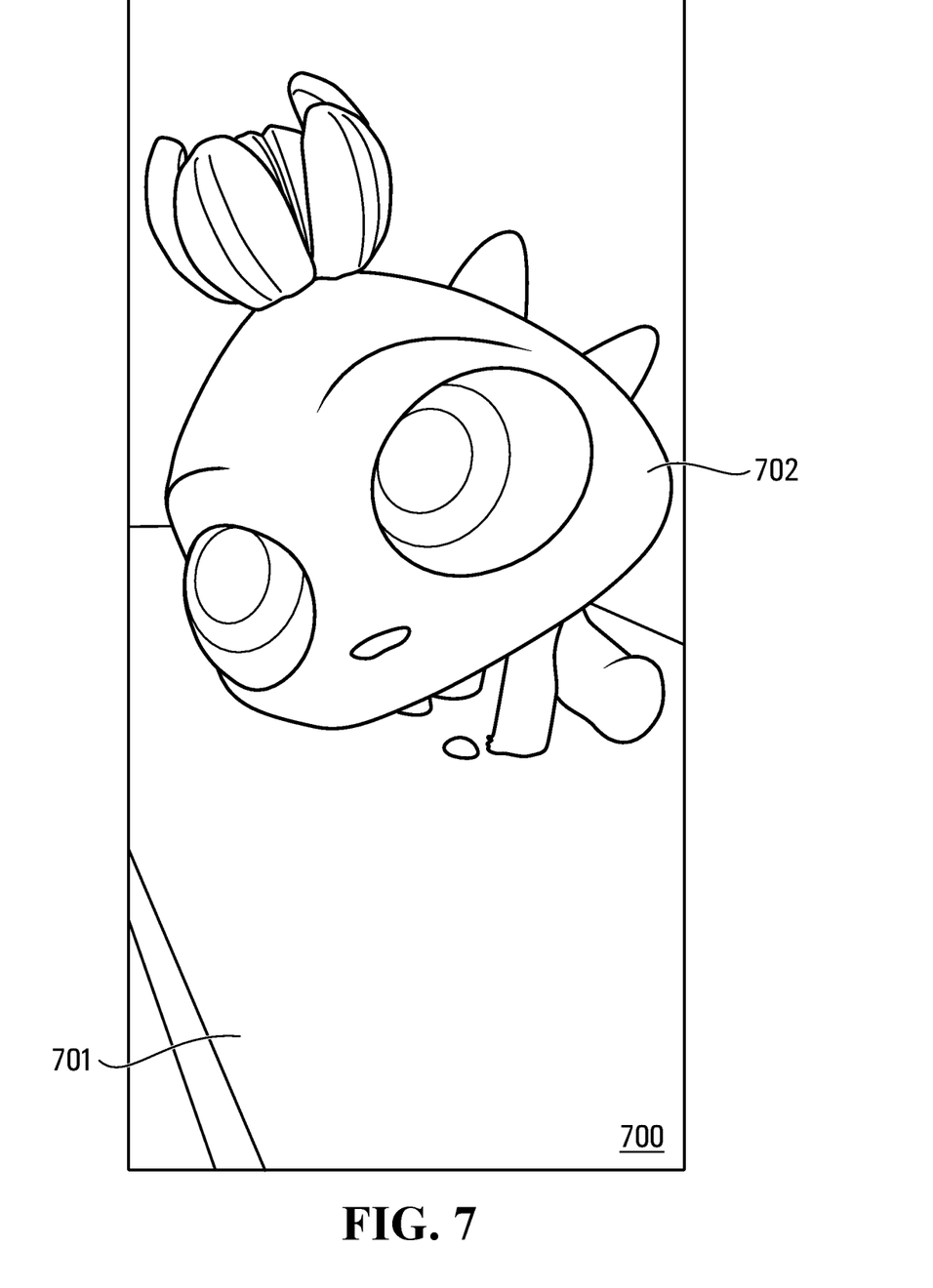
FIG. 7 is a diagram illustrating a scene in which a virtual character is rendered on a real-world surface without ambient occlusion.
Figure 8:
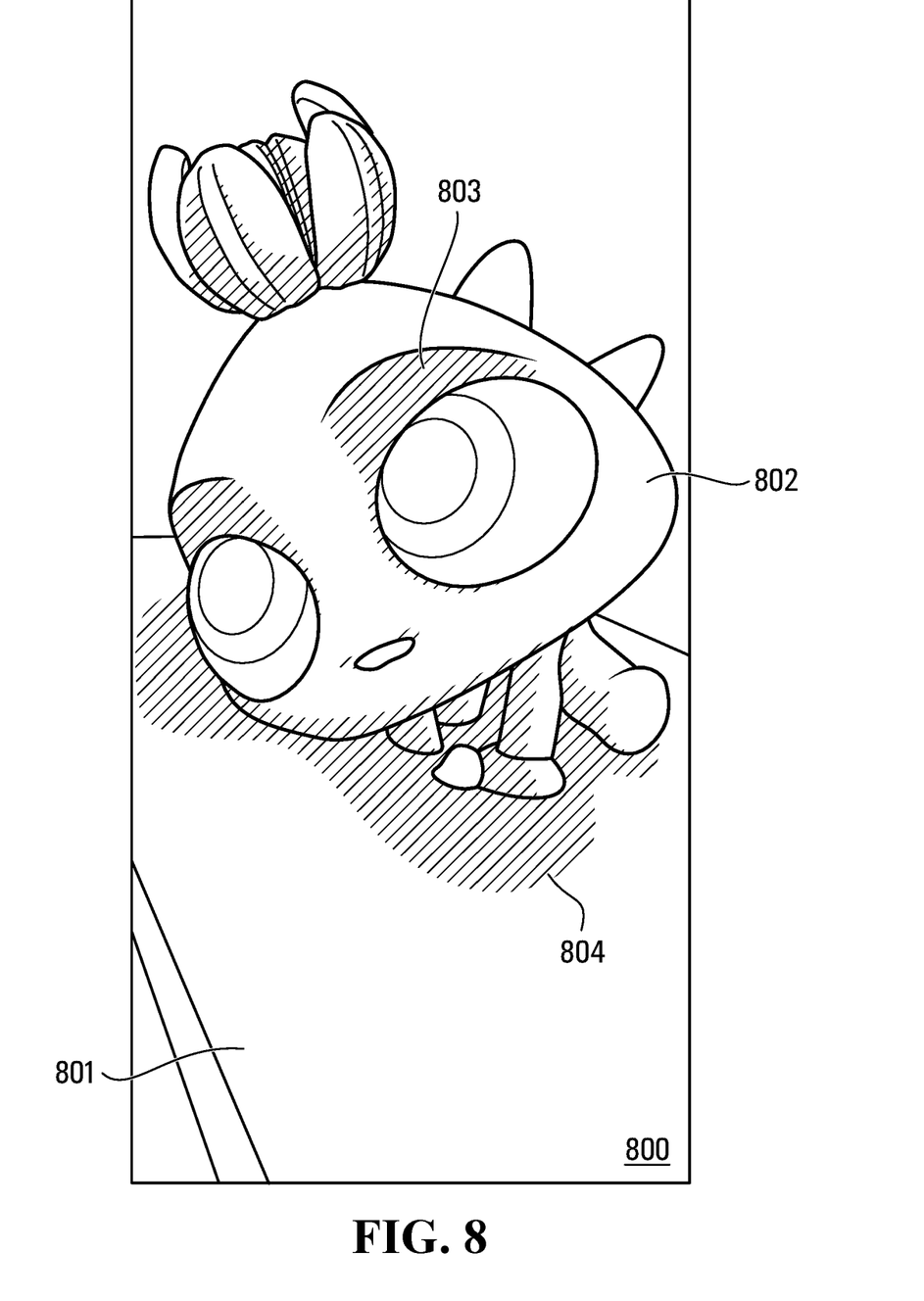
FIG. 8 is a diagram illustrating a scene in which a virtual character is rendered on a real-world surface with ambient occlusion in accordance with an embodiment of the present disclosure.

For example, in some embodiments, the AR application uses depth data from AR planes for a Screen-Space Ambient Occlusion (SSAO) post-processing pass. SSAO is a well-known computer graphics algorithm for approximating how exposed each pixel in a scene is to ambient lighting in real time. For example, FIG. 7 shows a scene 700 in which a virtual character 702 is rendered on a real-world surface 701 without ambient occlusion, and FIG. 8 shows a scene 800 in which the same virtual character 802 is rendered with ambient occlusions 803, 804. As can be seen from a comparison of FIG. 7 and FIG. 8, ambient occlusions introduce shading where objects intersect to simulate the effect of light being precluded from reaching crevices, cracks, or generally occluded surfaces. This makes the visual intersection between the table and the character, for example, much more realistic and pleasing to users of the mobile AR application.

Figure 9:
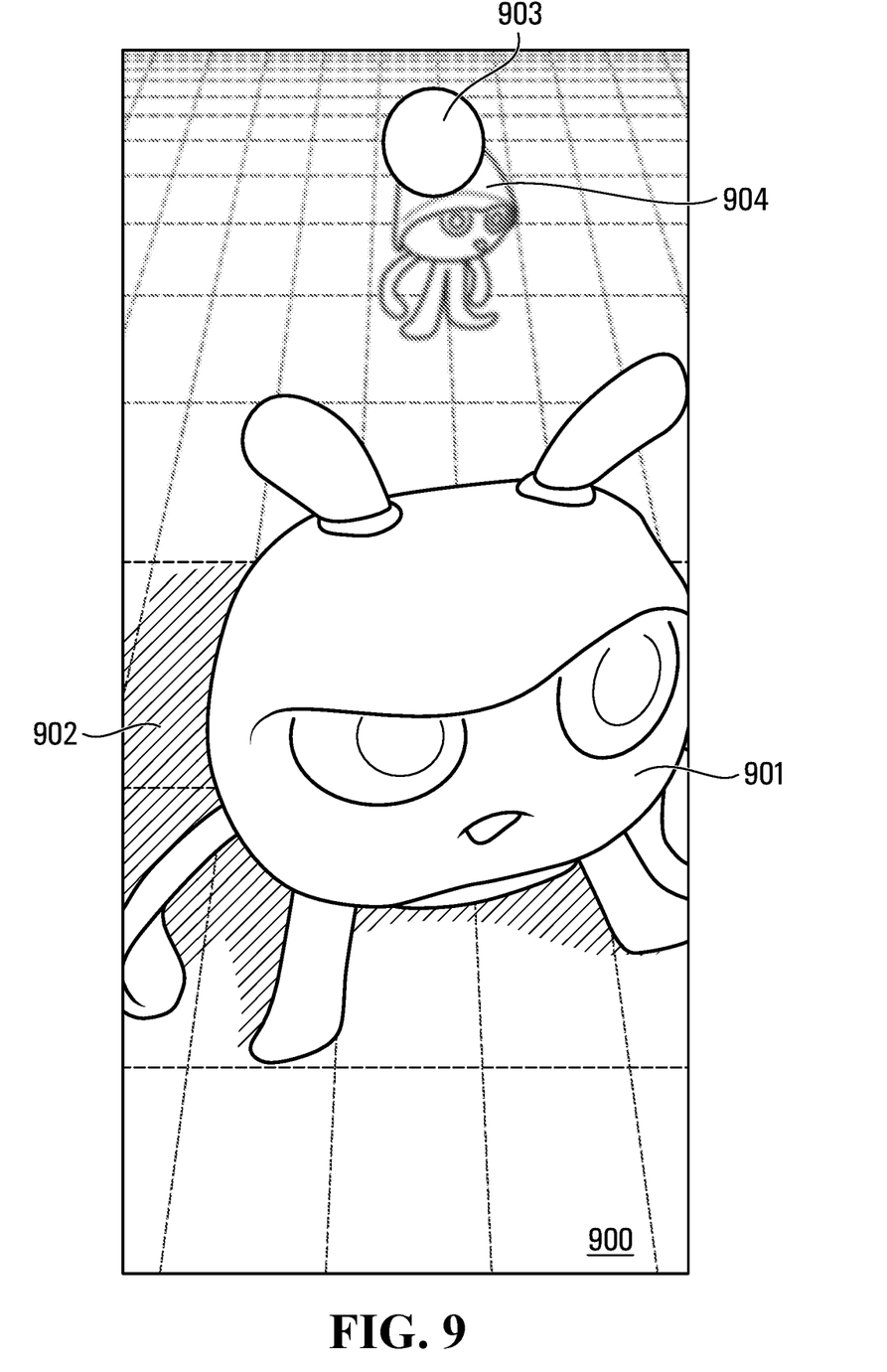
FIG. 9 is a diagram illustrating a scene in which a depth of field effect is rendered occlusion in accordance with an embodiment of the present disclosure.

Another advantage of the method described herein is shown in FIG. 9. In particular, by using the method described herein, it is possible to render a depth of field effect in a scene 900. More specifically, as will be understood by the skilled reader, the depth of field is the distance between the nearest and furthest objects that are in focus in an image.

In computer graphics terms, producing a depth of field effect is a full-screen post-process effect which takes as inputs the "color buffer" (i.e. the rendered image) and the depth buffer. The process performs a variable-size blurring of the image, effectively changing the size of a virtual circle of confusion depending on the difference between the depth of a pixel and that of the pre-determined virtual focal plane. Because the transparent occluding AR plane is written to the depth buffer, it can be blurred progressively as a function of its distance from the virtual focal plane.

As shown in FIG. 9, once a transparent occluding AR plane is rendered onto the ground, it is possible to not only blur the virtual character 904 that has been rendered outside the virtual depth of field, but also to blur the transparent occluding AR plane itself, in a progressive manner, the farther it gets from the virtual focal plane.

As a result, depth of field effects in accordance with the above disclosure mimic the focal plane of a physical camera. While these effects would normally only affect rendered virtual objects, again because the AR planes write to the depth buffer, the AR application can extend the effect to the entire scene, which makes some real-world surfaces and virtual surfaces come into focus and other become blurred.

The description and drawings merely illustrate the principles of the invention. It will thus be appreciated that those skilled in the art will be able to devise various arrangements that, although not explicitly described or shown herein, embody the principles of the invention and are included within its scope, as defined in the appended claims.

Furthermore, all examples recited herein are principally intended to aid the reader in understanding the principles of the invention and are to be construed as being without limitation to such specifically recited examples and conditions. For example, the present disclosure describes embodiments of the invention with reference to scenes comprising floors, tables and virtual objects and characters. It will however be appreciated by the skilled reader that the present invention can also advantageously be used in scenes comprising any other combination of real-world objects and surfaces, with any other virtual objects.

Moreover, all statements herein reciting principles, aspects, and embodiments of the invention, as well as specific examples thereof, are intended to encompass equivalents thereof.

Furthermore, while the aforementioned description refers to mobile devices, a person of skill in the art would readily recognize that steps of various above-described methods can be performed by any number of computing devices, such as video cameras, digital cameras, infrared cameras, desktop computers, laptop computers, tablets, smartphones, smart watches or other wearables. Herein, some embodiments are also intended to cover program storage devices, e.g., digital data storage media, which are, machine or computer readable and encode machine-executable or computer-executable programs of instructions, wherein said instructions perform some or all of the steps of the above-described methods. The embodiments are also intended to cover computers programmed to perform said steps of the above-described methods.

Any feature of any embodiment discussed herein may be combined with any feature of any other embodiment discussed herein in some examples of implementation. Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

The invention claimed is:

1. A method of rendering a virtual shadow onto a real-world surface in an image using an augmented reality application running on a computing device having a camera, the method comprising:
    capturing an image of a scene using the camera;
    detecting the real-world surface in the image;
    obtaining the geometry of the real-world surface;
    rendering a transparent occluding virtual plane onto the real-world surface by using the obtained geometry;
    creating a virtual directional light for the image, the virtual directional light radially extending from a point in space in the scene;
    using the created virtual directional light source to write a texture associated with a virtual object into a shadow buffer; and
    projecting the texture written to the shadow buffer onto the transparent occluding virtual plane in the image.

2. The method of claim 1, wherein the step of rendering the transparent occluding virtual plane comprises the steps of:
    rendering a virtual plane by disabling color writes in the rendering of the virtual plane; and
    writing the virtual plane to the depth buffer of the image.

3. The method of claim 1, wherein the computing device is a mobile device.

4. The method of claim 3, wherein the mobile device is a smartphone or tablet.

5. The method of claim 1, wherein the virtual object is a game character and the augmented reality application is an augmented reality video game.

6. The method of claim 1, wherein the rendering is performed using a shader.

7. The method of claim 1, wherein the step of projecting the texture written to the shadow buffer onto the transparent occluding virtual plane includes projective texture mapping.

8. The method of claim 7, wherein the step of projecting the texture written to the shadow buffer onto the transparent occluding virtual plane includes drawing the shadow into the image by way of multiplicative blending.

9. The method of claim 1, wherein the method further comprises the steps of sampling the ambient light at the vertex location of the virtual shadow and the transparent occluding virtual plane, and the projecting step further comprises the step of tinting the virtual shadow using the sampled ambient light level.

10. The method of claim 1, wherein the method further comprises the steps of blurring the virtual shadow written to the shadow buffer.

11. The method of claim 1, wherein the method further comprises the step of post-processing the image to generate ambient occlusion between the virtual object and the transparent occluding virtual plane.

12. The method of claim 1, wherein the method further comprises the step of post-processing the image to generate a depth of field effect by blurring the pixels of the transparent occluding virtual plane in part based on their depth with respect to the camera.

13. The method of claim 1, wherein the point in space in the scene is determined by locating the strongest real-world light source.

14. The method of claim 1, wherein the point in space in the scene is the zenith.

15. A system for rendering a virtual shadow onto a real-world surface in an image using an augmented reality application running on a computing device having a camera, the system comprising a processing entity configured to:
    capture an image of a scene using the camera;
    detect the real-world surface in the image;
    obtain the geometry of the real-world surface;
    render a transparent occluding virtual plane onto the real-world surface by using the obtained geometry,
    create a virtual directional light for the image, the virtual directional light radially extending from a point in space in the scene;
    use the created virtual directional light source to write a texture associated with a virtual object into a shadow buffer; and
    project the texture written to the shadow buffer onto the transparent occluding virtual plane in the image.

16. A non-transitory processor-readable storage medium, having processor-executable instructions stored thereon, which, when executed by a processor, cause a computing device comprising the processor and a camera to implement an augmented reality application configured to:
    capture an image of a scene using the camera;
    detect the real-world surface in the image;
    obtain the geometry of the real-world surface;
    render a transparent occluding virtual plane onto the real-world surface by using the obtained geometry,
    create a virtual directional light for the image, the virtual directional light radially extending from a point in space in the scene;
    use the created virtual directional light source to write a texture associated with a virtual object into a shadow buffer; and
    project the texture written to the shadow buffer onto the transparent occluding virtual plane in the image.

17. The processor-readable storage medium of claim 16, wherein the augmented reality application is further configured to render the transparent occluding virtual plane by:
    rendering a virtual plane by disabling color writes in the rendering of the virtual plane; and
    writing the virtual plane to the depth buffer of the image.

18. The processor-readable storage medium of claim 16, wherein the computing device is a mobile device.

19. The processor-readable storage medium of claim 18, wherein the mobile device is a smartphone or tablet.

20. The processor-readable storage medium of claim 16, wherein the virtual object is a game character and the augmented reality application is an augmented reality video game.

21. The processor-readable storage medium of claim 16, wherein the augmented reality application is further configured to render using a shader.

22. The processor-readable storage medium of claim 16, wherein the augmented reality application is further configured to project the texture written to the shadow buffer onto the transparent occluding virtual plane in the image using projective texture mapping.

23. The processor-readable storage medium of claim 22, wherein the augmented reality application is further configured to project the texture written to the shadow buffer onto the transparent occluding virtual plane in the image by drawing the shadow into the image by way of multiplicative blending.

24. The processor-readable storage medium of claim 16, wherein the augmented reality application is further configured to sample the ambient light at the vertex location of the virtual shadow and the transparent occluding virtual plane, and to tint the virtual shadow using the sampled ambient light level.

25. The processor-readable storage medium of claim 16, wherein the augmented reality application is further configured to blur the virtual shadow written to the shadow buffer.

26. The processor-readable storage medium of claim 16, wherein the augmented reality application is further configured to post-process the image to generate ambient occlusion between the virtual object and the transparent occluding virtual plane.

27. The processor-readable storage medium of claim 16, wherein the augmented reality application is further configured to the post-process the image to generate a depth of field effect by blurring the pixels of the transparent occluding virtual plane in part based on their depth with respect to the camera.

28. The processor-readable storage medium of claim 16, wherein the point in space in the scene is determined by locating the strongest real-world light source.

29. The processor-readable storage medium of claim 16, wherein the point in space in the scene is the zenith.

30. A rendering method comprising:
obtaining an image comprising a real-world surface;
rendering a virtual plane onto the real-world surface; and
rendering a virtual object in the image;
wherein the virtual plane is configured to be transparent to the real-world surface, and wherein the virtual plane is configured to receive a virtual shadow from a light source so as to occlude at least part of the virtual object located behind the virtual plane relative to the light source.

31. The rendering method defined in claim 30, wherein the virtual plane comprises a geometry that matches a geometry of the real-world surface.

32. The rendering method defined in claim 31, wherein obtaining the image comprising the real-world surface is carried out using a camera of a mobile device and wherein rendering the virtual object in the image is carried out by an augmented reality application executed by the mobile device.

33. The rendering method defined in claim 32, wherein rendering the virtual plane comprises disabling color writes and writing the virtual plane to a depth buffer of the image.

* * * * *